Jan. 9, 1962 H. REHMANN 3,016,263
SLIDING ROOFS FOR AUTOMOTIVE VEHICLES AND THE LIKE
Filed Jan. 2, 1959
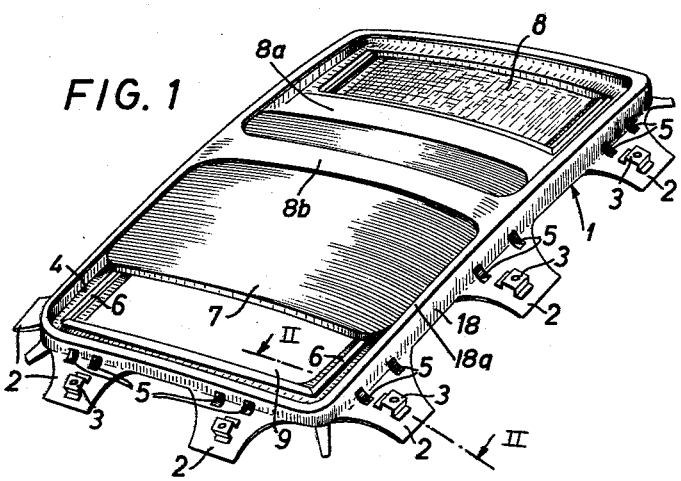
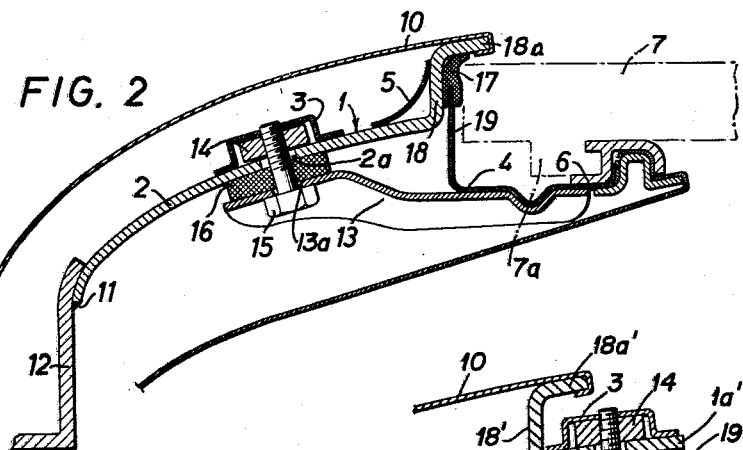
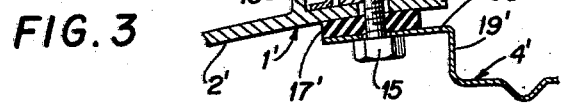
INVENTOR
HEINRICH REHMANN
BY MICHAEL S. STRIKER
ATTORNEY.

United States Patent Office 3,016,263
Patented Jan. 9, 1962

3,016,263
SLIDING ROOFS FOR AUTOMOTIVE VEHICLES AND THE LIKE
Heinrich Rehmann, Stockdorf, near Munich, Germany, assignor to Wilhelm Baier, K.G., Stockdorf, near Munich, Germany
Filed Jan. 2, 1959, Ser. No. 784,671
Claims priority, application Germany Jan. 11, 1958
11 Claims. (Cl. 296—137)

The present invention relates to improvements in the construction and mounting of sliding roofs for automotive vehicles, and more particularly to a rigid sliding roof member, to an improved reinforcing and supporting frame therefor, and to an improved connection between the body of a conveyance and the reinforcing frame.

An object of the present invention is to provide a rigid sliding roof member and a supporting frame therefor which may be prefabricated and installed as a unit in the roof frame of an automotive vehicle.

Another object of the invention is to provide a rigid sliding roof member and a supporting and reinforcing frame therefor which latter is so constructed that it may be connected to the body of a conveyance in a very simple and time-saving manner.

A further object of the instant invention is to provide a rigid sliding roof member and a supporting frame therefor which latter is so constructed that the position of the sliding roof member may be adjusted with respect thereto, and that the sliding roof member may be guided therein in permanently sealing position.

An additional object of my invention is to provide a sliding roof member and a reinforcing frame therefor which may be prefabricated and connected as a unit to the roof frame in different types of conveyances.

A still further object of the invention is to provide a rigid sliding roof member with a supporting frame therefor so constructed that its outer covering may conform to the curvature of the vehicle body without additional adjusting means.

A yet further object of the invention is to provide a rigid sliding roof member and a reinforcing frame therefor so constructed and assembled as to prevent rattling when installed on, and to prevent entry of moisture into the interior of, the conveyance.

A concomitant object of the invention is to provide a reinforcing and supporting frame for a rigid sliding roof member which is very simple, easy to install, and which may be mounted in the roof frame of a conveyance with the paint already applied and the lining already connected thereto.

The above and certain other objects of the invention are attained by the provision of a rigid sliding roof member which is installed in an apertured supporting and reinforcing frame, and is slidable in a specially constructed channel or way, the latter being preferably detachably, adjustably and sealingly connected to the aforesaid frame. The reinforcing frame is usually permanently connected to the body, i.e. to the roof frame, of a conveyance, e.g. an automobile or the like. The channel is connected to the reinforcing frame in adjustable manner with resilient sealing and adjustment-permitting means therebetween, and also supports or is integrally formed with guide-ways or tracks on which the rigid roof member slides. The releasable connection between the channel and the reinforcing frame may comprise boxed nuts and bolts with a resilient material interposed therebetween which latter constitutes noise-eliminating and sealing means to prevent entry of moisture into the conveyance. In addition, the resilient material allows for adjustments in the position of the channel with respect to the reinforcing frame, and permits adaptation thereof to the configuration of the roof frame in an automotive vehicle or the like. The connection between the frame and the channel may comprise separate resilient sealing and resilient adjusting means, or a single resilient strip may perform both said functions, if desired.

The novel features which are considered as characteristic for the invention are set forth in particular in the appended claims. The invention itself, however, both as to its construction and its method of operation, together with additional objects and advantages thereof, will be best understood from the following description of two specific embodiments when read in connection with the accompanying drawing, in which:

FIG. 1 is perspective view of the reinforcing frame with the rigid sliding roof member installed therein, and further showing connecting elements in the form of bridges by means of which the reinforcing frame may be fixed to the roof frame of a conveyance;

FIG. 2 is an enlarged transverse section taken on line II—II of FIG. 1, as seen in the direction of arrows, the position of the roof member being shown in phantom lines and further showing a portion of the roof frame to which the novel assembly is connected; and FIG. 3 is fragmentary sectional view of a modified connection between the reinforcing frame and the roof guiding channel.

Referring now in greater detail to the drawing, and first to FIGS. 1 and 2, the reinforcing frame 1 is of substantially rectangular contour and is formed with openings 8, 9 at its rear and front ends, respectively, which are separated by a transverse member 8a forming part of frame 1. The rear opening 8 is closed by the roof skin 10, shown in FIG. 2, when the member 1 is installed in a conveyance. The roof skin 10 is also connected to a second transverse member 8b forming part of frame 1 and disposed at a level higher than the level of member 8a. The front opening 9 may be selectively closed or at least partially exposed by a rigid sliding roof member or plate 7 which is of substantially rectangular contour and which travels upon guideways or rails 6 forming part of, or installed in, a special channel or way which latter is removably, sealingly and adjustably connected to the frame 1 in a manner best shown in FIG. 2. Channel 4 extends along the inner front side and along inner lateral sides of member 1 beyond the rear end of opening 9. In FIG. 1, the opening 9 is partly closed or screened by rigid roof member 7 which is slidable between transverse members 8a and 8b.

Roof supporting and reinforcing frame 1 is formed with outwardly projecting curved extensions or bridges 2 constituting means for rigidly connecting member 1 to the roof frame 12 of a conveyance, e.g. by welding 11. In cross-section, reinforcing frame 1 has the shape of inverted letter L consisting of a vertical leg or portion 18 and a horizontal leg or portion 18a. The latter is connected to the roof skin 10 which thus extends over the inner edges of and surrounds the entire reinforcing frame in addition to covering the opening 8. Spaced stiffening strips 5 are disposed between the vertical portion 18 and bridges 2 of frame 1.

At its outer, i.e. upper, side, each bridge 2 carries at least one box or cage 3 for reception of a nut 14 whose tapped bore is aligned with a bore 2a in member 2. Each nut 14 meshes with the stem of a bolt 15 which connects the respective bridge 2 of frame 1 with one of a series of fastening members or brackets 13, the latter being connected to the underside of channel 4. The channel also carries the rail 6 on which the rigid sliding roof 7 is guided. In FIG. 1, the channel 4 comprises three sections one of which extends along the front inner side of frame 1. The other two sections are parallel and extend along the inner lateral sides of member 1 and rearwardly beyond the opening 9, and between transverse members 8a, 8b.

Each bolt 15 passes through an aperture 13a in respective bracket 13 and traverses an elastic insert or lip 16 which latter allows for adjustments in the position of channel 4 with respect to bridges 2, i.e. with respect to the reinforcing frame 1. Vertical portion or wall 19 of channel 4 carries at its upper end a sealing lining 17 of elastic material which abuts against the inner side of vertical portion 18 and preferably against the underside of horizontal portion 18a of frame 1. Thus, the entry of moisture into the interior of roof frame 12 is positively prevented and the connection between frame 1 and channel 4 is entirely noiseless, there being no direct contact between relatively movable metallic parts.

Rigid roof member 7, shown in phantom lines in FIG. 2, is formed with or carries at its underside hook shaped members 7a engaging with rails 6 in lateral sections of channel 4 which are parallel to each other whereby the member 7 is guided in its movements toward and away from the front end of reinforcing frame 1. The rails in the front section of channel 4 may be omitted since they are transverse to the direction in which the roof member 7 reciprocates. The edges of roof member 7 which extend into channel 4 preferably abut against the adjacent portions of resilient strip 17 to seal the opening 9 when the roof member is in its extreme position adjacent to the front end of reinforcing frame 1. In FIG. 2, roof member 7 is assumed to be moved all the way to the front end of the reinforcing frame into a position in which it fully closes the opening or cutout 9.

Reinforcing frame 1 may be painted before or after connection of its bridges 2 to the roof frame 12, either with or without a lining attached thereto. The channel 4, too, may be painted and connected to frame 1 before or after the latter is installed in the conveyance. Thus, the reinforcing frame and the channel may be manufactured as separate units and connected in fully finished condition to the roof frame 12. This is important for mass manufacture as it simplifies the construction of the roof frame.

According to a different embodiment of my invention which is shown in FIG. 3, a modified channel 4' is formed with a vertical wall 19' whose upper end portion 19a' is bent inwardly into a substantially horizontal plane adjacent to the underside of a rib or extension 1a' forming part of modified reinforcing frame 1'. Rib 1a' extends inwardly from the underside of vertical frame portion 18' which latter terminates in the horizontal member 18a' connected to roof skin 10. A sealing strip 17' of resilient material is inserted between wall portion 19a' and rib 1a' to prevent rattling noises when the conveyance is in motion, and also to hermetically seal the connection between parts 1' and 4'. This arrangement is simpler insofar as a single resilient insert 17' replaces parts 16 and 17 shown in FIG. 2, and the brackets 13 may be omitted altogether, the bridges 2' merely serving to connect frame 1' to the roof frame 12 in the manner as shown in FIG. 2. The connection between parts 1a' and 19a' again comprises a cage or housing 3, a nut 14 therein, and a bolt 15, though it will be readily understood that a different type of connecting means may be substituted therefor.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention.

What is claimed as new and desired to be secured by Letters Patent is:

1. In a conveyance having a roof frame and a roof skin, in combination: a reinforcing frame having an opening and comprising a vertical portion having an upper end and a horizontal portion extending inwardly from said upper end and connected to the roof skin; means for rigidly connecting said reinforcing frame to the roof frame; a channel surrounding said opening and comprising a substantially vertical wall inwardly adjacent to the vertical portion of said frame, said wall having an upper end; a resilient strip connected to the upper end of said wall and in contact at least with the vertical portion of said reinforcing frame; means for releasably connecting the channel to said reinforcing frame; and a rigid roof member having edges slidably received in said channel for alternately closing or at least partially exposing said opening.

2. In a conveyance having a roof frame and a roof skin, in combination: a reinforcing frame having an opening and comprising a substantially vertical portion having an upper end and a substantially horizontal portion extending inwardly from said upper end and connected to said roof skin; a plurality of bridge members extending outwardly from said reinforcing frame and each rigidly connected to the roof frame; a channel surrounding said opening and comprising a substantially vertical wall inwardly adjacent to said vertical portion, said wall having an upper end; a resilient strip connected to the upper end of said wall and in contact with said vertical portion; a boxed nut connected to each bridge member; a plurality of brackets each connected to said channel and each extending into the proximity of one of said bridge members; a resilient element interposed between each bracket and the respective bridge member; bolt means, one for each of said nuts, for releasably and adjustably connecting the brackets with respective bridge members; and a rigid roof member having edges slidably received in said channel for alternately closing or at least partly exposing said opening.

3. In a conveyance having a roof frame and a roof skin, in combination: a reinforcing frame having an opening and comprising a substantially vertical portion having an upper end and a substantially horizontal portion extending inwardly from said upper end and connected to said roof skin; a plurality of bridge members extending outwardly from said reinforcing frame and each rigidly connected to the roof frame; a channel surrounding said opening and comprising a substantially vertical wall inwardly adjacent to said vertical portion, said wall having an upper end; a resilient strip connected to the upper end of said wall and in contact with said vertical portion; a boxed nut connected to each bridge member; a plurality of brackets each connected to said channel and each extending into the proximity of one of said bridge members; a resilient element interposed between each bracket and the respective bridge member; bolt means, one for each of said nuts, for releasably and adjustably connecting the brackets with respective bridge members; guideways connected to said channel; and a rigid roof member having edges slidable along said guideways for alternately closing or at least partly exposing said opening.

4. In an automotive vehicle having a roof frame and a roof skin, in combination: a reinforcing frame having an opening, a plurality of outwardly extending bridge members each rigidly connected to the roof frame, a substantially vertical portion having an upper end and a lower end, a substantially horizontal portion extending inwardly from the upper end of said vertical portion and connected to the roof skin, and an inwardly extending rib connected to the lower end of said vertical portion; a channel surrounding said opening and comprising a substantially vertical wall having an upper end and a substantially horizontal wall extending outwardly from the upper end of said vertical wall into the proximity of said rib; resilient means interposed between the horizontal wall and said rib; means for releasably and adjustably connecting the horizontal wall with said rib; guideways connected to said channel; and a rigid roof member having edges extending into said channel and slidable along said guideways for alternately closing or at least partially exposing said opening.

5. A sliding roof construction for connection to the roof frame of an automotive vehicle comprising, in combination: a reinforcing frame having an opening, a substantially vertical portion having an upper end, a lower end, a substantially horizontal portion extending inwardly from the upper end of said vertical portion, and a plurality of bridge members each connected to the lower end of said vertical portion and extending outwardly from said reinforcing frame; a channel comprising a substantially vertical wall disposed within and adjacent to said vertical portion, said wall having an upper end; a resilient lining connected to the upper end of said wall and in sealing contact with said vertical portion; a plurality of brackets, each connected to said channel and each extending into the proximity of one of said bridge members; a resilient element interposed between each bracket and the respective bridge member; means for releasably and adjustably connecting each bracket with the respective bridge member; guideways disposed in said channel; and a rigid roof member having edges extending into said channel and slidable along said guideways for movements between a position in which it closes, and a position in which it at least partially exposes said opening.

6. In a conveyance, in combination, a roof frame; a metallic reinforcing frame having a substantially vertical portion defining an opening and a plurality of bridges rigid with and extending outwardly from said vertical portion, said bridges rigidly connected to said roof frame; a roof skin enclosing said roof frame and rigidly connected to said reinforcing frame so as to surround and to form a stiffened liner about said opening; channel means provided within said reinforcing frame and surrounding at least a portion of said opening; a plurality of brackets connected to said channel means and each extending into the proximity of one of said bridges; means for releasably connecting said brackets to the respective bridges so that the channel means may be separated from the reinforcing frame without necessitating separation of the roof skin from the reinforcing frame; guideways connected with said channel means; and a rigid roof member slidably mounted in said guideways for alternately closing and exposing said opening.

7. In a conveyance, in combination, a roof frame; a metallic reinforcing frame having an upper end portion and including a substantially vertical portion defining an opening; means for rigidly connecting said reinforcing frame to said roof frame; a roof skin enclosing said roof frame and rigidly connected to the upper end portion of said reinforcing frame so as to surround said opening; channel means provided within said reinforcing frame and bounding at least a portion of said opening; means for releasably connecting said channel means to said reinforcing frame at points spaced from said upper end portion thereof so that the channel means may be separated from the reinforcing frame without necessitating separation of the roof skin from the reinforcing frame; guide means connected with said channel means; and a rigid roof member slidably mounted in said guide means for alternately closing and exposing said opening.

8. A combination as set forth in claim 7, further comprising resilient sealing means interposed between said channel means and said reinforcing frame, said channel means adjustably connected with said reinforcing frame.

9. A combination as set forth in claim 7, wherein said reinforcing frame comprises a plurality of bridges rigid with and extending outwardly from said vertical portion thereof, said bridges rigidly connected to said roof frame and said channel means releasably connected with said bridges.

10. A combination as set forth in claim 9, wherein the upper end portion of said reinforcing frame is substantially horizontal and extends inwardly from said vertical portion.

11. In a conveyance, in combination, a roof frame; a reinforcing frame having an upper end portion and comprising a substantially horizontal portion spaced from said upper end portion and a vertical portion consisting of sheet metal and defining an opening, said vertical portion having a lower end rigid with said horizontal portion; means for rigidly connecting said reinforcing frame with said roof frame; a roof skin enclosing said roof frame and rigidly connected with the upper end portion of said reinforcing frame so as to surround said opening; channel means provided within said reinforcing frame and bounding at least a portion of said opening, said channel means comprising a substantially horizontal wall adjacent to said horizontal portion; resilient sealing means disposed between said wall and said horizontal portion; means for releasably connecting said wall to said horizontal portion whereby the channel means may be separated from the reinforcing frame without necessitating separation of the roof skin from the reinforcing frame; guideways connected with said channel means; and a rigid roof member slidably mounted in said guideways for alternately closing and exposing said opening.

References Cited in the file of this patent

UNITED STATES PATENTS

| | | |
|---|---|---|
| 1,844,548 | Hammerl | Feb. 9, 1932 |
| 1,893,351 | Austin | Jan. 3, 1933 |
| 2,122,712 | Bishop | July 5, 1938 |
| 2,193,608 | Votypka | Mar. 12, 1940 |
| 2,338,225 | Ball | Jan. 4, 1944 |
| 2,410,332 | Ball | Oct. 29, 1946 |

FOREIGN PATENTS

| | | |
|---|---|---|
| 326,554 | Great Britain | Mar. 17, 1930 |
| 340,394 | Great Britain | Jan. 1, 1931 |
| 650,859 | Great Britain | Mar. 7, 1951 |